(«12») United States Patent
Chung et al.

(10) Patent No.: US 7,930,718 B2
(45) Date of Patent: Apr. 19, 2011

(54) METHOD AND DIGITAL BROADCASTING RECEIVER FOR DISPLAYING DIGITAL BROADCAST CHANNEL INFORMATION

(75) Inventors: Dae-Suk Chung, Suwon-si (KR); Sun-Hee Chang, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 1525 days.

(21) Appl. No.: 11/300,182

(22) Filed: Dec. 14, 2005

(65) Prior Publication Data
US 2006/0150230 A1 Jul. 6, 2006

(30) Foreign Application Priority Data

Jan. 4, 2005 (KR) .................. 10-2005-0000583
Oct. 12, 2005 (KR) .................. 10-2005-0096011

(51) Int. Cl.
H04N 5/445 (2006.01)
(52) U.S. Cl. .......................... 725/38; 725/62
(58) Field of Classification Search .............. 725/39, 725/56; 370/320, 322, 329, 335, 371
See application file for complete search history.

(56) References Cited

U.S. PATENT DOCUMENTS

| | | | |
|---|---|---|---|
| 5,969,769 A | 10/1999 | Hamadate | |
| 6,115,080 A | 9/2000 | Reitmeier | |
| 6,154,203 A * | 11/2000 | Yuen et al. | 725/52 |
| 6,693,896 B1 * | 2/2004 | Utsumi et al. | 370/352 |
| 6,732,371 B1 * | 5/2004 | Lee et al. | 725/41 |
| 7,373,650 B1 * | 5/2008 | Rodriguez et al. | 725/41 |
| 7,420,619 B2 * | 9/2008 | Cha | 348/561 |
| 2002/0166122 A1 | 11/2002 | Kikinis et al. | |
| 2004/0023629 A1 * | 2/2004 | Klank | 455/130 |
| 2005/0160343 A1 * | 7/2005 | Ji | 714/758 |

FOREIGN PATENT DOCUMENTS

| | | |
|---|---|---|
| CN | 1101107 | 2/2003 |
| KR | 1020040025073 | 3/2004 |
| KR | 1020040090185 | 10/2004 |
| WO | WO 98/56172 | 12/1998 |

OTHER PUBLICATIONS

Victor H.S. Ha et al., Portable Receivers for Digital Multimedia Broadcasting, IEEE Transactions on Consumer Electronics, vol. 50, No. 2, May 2004, pp. 666-673.
Michael Kornfeld, DVB-H—The Emerging Standard for Mobile Data Communication, 2004 IEEE International Symposium on Reading Consumer Electronics, Sep. 1, 2004, pp. 193-198.

\* cited by examiner

Primary Examiner — Andrew Y Koenig
Assistant Examiner — Aklil Tesfaye
(74) Attorney, Agent, or Firm — The Farrell Law Firm, P.C.

(57) ABSTRACT

A method for displaying digital broadcast channel information on a digital broadcasting receiver, which includes searching for an unused reserve communication path among all communication paths over which digital broadcast data is transmitted; sequentially extracting identifiers of channels other than the one currently selected from digital broadcast channel guide information and receiving video data of a program, which is being broadcast on a channel corresponding to a first extracted identifier, through the reserve communication path; processing the received video data to extract image data from the video data, extracting digital broadcast channel guide information corresponding to the image data and displaying the extracted information together with the image data; and receiving video data of a channel subsequent to the channel corresponding to the displayed image data through the reserve communication path and processing the video data.

25 Claims, 10 Drawing Sheets

| CHANNEL 1 | CHANNEL 2 | CHANNEL 3 |
|---|---|---|
| CHANNEL 4 | CHANNEL 5 | CHANNEL 6 |
| CHANNEL 7 | CHANNEL 8 | CHANNEL 9 |

METHOD AND DIGITAL BROADCASTING RECEIVER FOR DISPLAYING DIGITAL BROADCAST CHANNEL INFORMATION

PRIORITY

This application claims priority under 35 U.S.C. §119 to two applications entitled "Method and Digital Broadcasting Receiver for Displaying Digital Broadcast Channel Information," one filed with the Korean Intellectual Property Office on Jan. 4, 2005 and assigned Serial No. 2005-583 and the other filed with the Korean Intellectual Property Office on Oct. 12, 2005 and assigned Serial No. 2005-96011, the contents of which are incorporated herein by reference.

BACKGROUND OF THE INVENTION

1. Field of the Invention

The present invention relates to a digital broadcasting receiver, and more particularly to a method for displaying digital broadcast channel information and a digital broadcasting receiver using the method.

2. Description of the Related Art

Generally, viewers who wish to get information about channels other than the one currently selected have to manually select and obtain the channel information through an Electronic Program Guide (EPG).

EPG is an on-screen television guide that displays text-based information on channels, programs, broadcast times and so on, without offering any image information on broadcast programs. Viewers have to keep pressing keys to scroll through and view the EPG information on the other channels.

SUMMARY OF THE INVENTION

Accordingly, the present invention has been made to solve the above-mentioned problems occurring in the prior art, and an object of the present invention is to provide a method for displaying digital broadcast channel information including text and image data, and a digital broadcasting receiver using the method.

Another object of the present invention is to provide a method for automatically displaying information about channels other than the one currently selected and a digital broadcasting receiver using the method.

In order to accomplish the above objects of the present invention, there is provided a method for displaying digital broadcast channel information on a digital broadcasting receiver, which includes searching for an unused reserve communication path among all communication paths over which digital broadcast data is transmitted; sequentially extracting identifiers of channels other than the one currently selected from digital broadcast channel guide information and receiving video data of a program, which is being broadcast on a channel corresponding to a first extracted identifier, through the reserve communication path; processing the received video data to extract image data from the video data, extracting digital broadcast channel guide information corresponding to the image data and displaying the extracted information together with the image data; and receiving video data of a next channel subsequent to the channel corresponding to the displayed image data through the reserve communication path and processing the video data.

In accordance with another aspect of the present invention, there is provided a digital broadcasting receiver having a display screen with a Picture-in-Picture (PIP) function, which includes a receiver module for receiving digital broadcast data and searching for an unused reserve communication path among all communication paths over which the digital broadcast data is transmitted; a memory for storing digital broadcast channel guide information received through the receiver module; a controller for extracting identifiers of channels other than the one currently selected from the digital broadcast channel guide information stored in the memory and receiving video data of programs broadcast on channels corresponding to the identifiers through the reserve communication path, with changing of channel being carried out according to the identifiers; and a demux module for extracting image data from video data of each channel received through the reserve communication path, extracting digital broadcast channel guide information corresponding to the extracted image data from the memory and displaying the extracted information together with the image data on the display window under the control of the controller.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Figure 1:
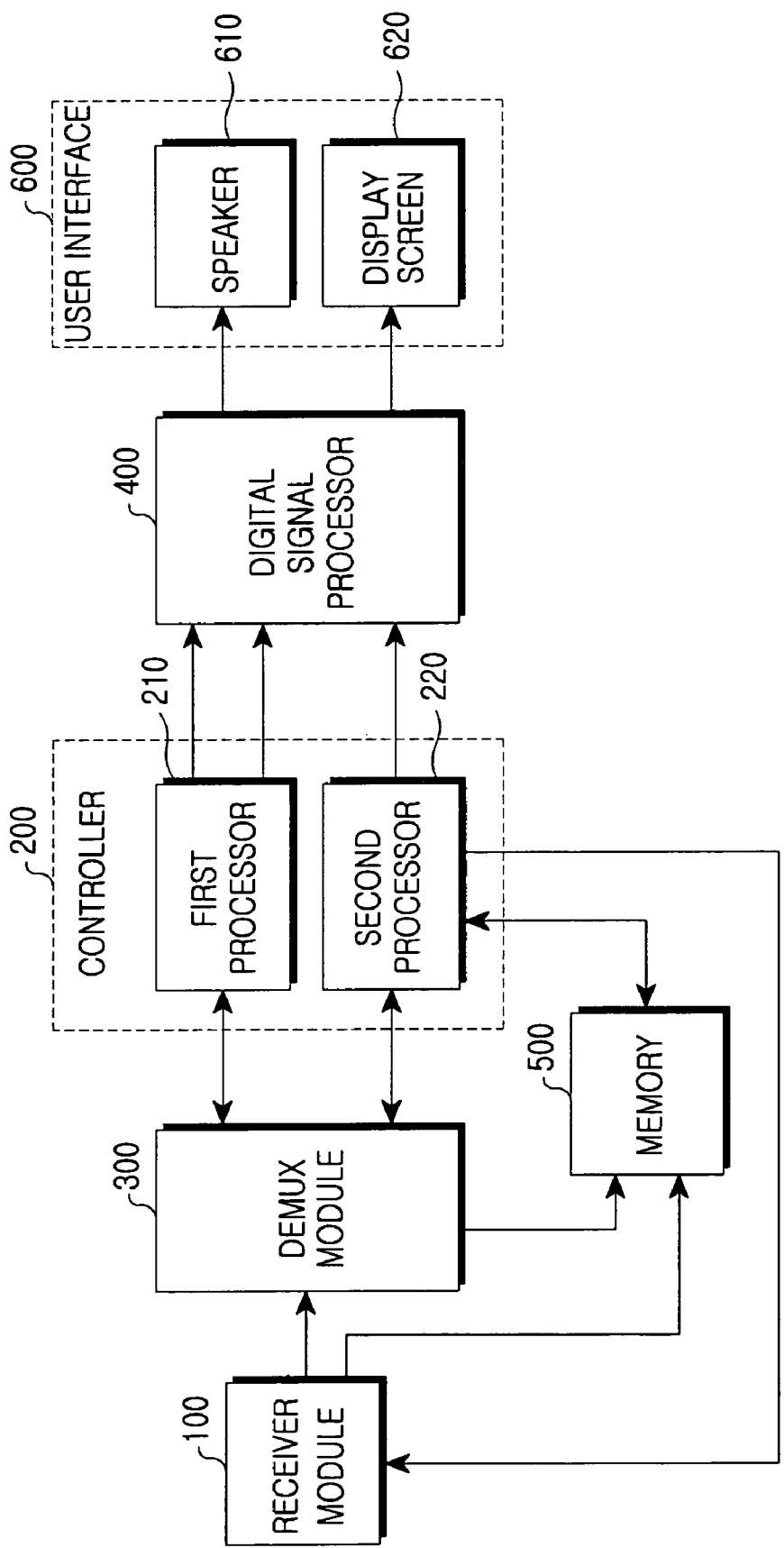
FIG. 1 is a block diagram of a digital broadcasting receiver capable of displaying digital broadcast channel information according to a preferred embodiment the present invention.

Hereinafter, preferred embodiments of the present invention will be described with reference to the accompanying drawings. In the drawings, the same element, although depicted in different drawings, will be designated by the same reference numeral or character. Also, in the following description of the present invention, a detailed description of known functions and configurations incorporated herein will be omitted when it may make the subject matter of the present invention unclear.

FIG. 1 is a block diagram of a digital broadcasting receiver capable of displaying digital broadcast channel information according to a preferred embodiment of the present invention.

Referring to FIG. 1, a Digital Multimedia Broadcasting (DMB) receiver has a receiver module 100 for receiving digital broadcast data through Code Division Multiplexing (CDM) channels which are communication paths used to transmit data in System-E satellite DMB according to International Telecommunication Union-Radio (ITU-R)-R(Radio) Series BO 1130.4 The System-E standard defines that a DMB system should receive a plurality of CDM channels to offer a single broadcasting service to a DMB receiver. The configuration of CDM channels, the communication paths over which DMB data is transmitted, will be explained in detail with reference to FIG. 2.

Figure 2:
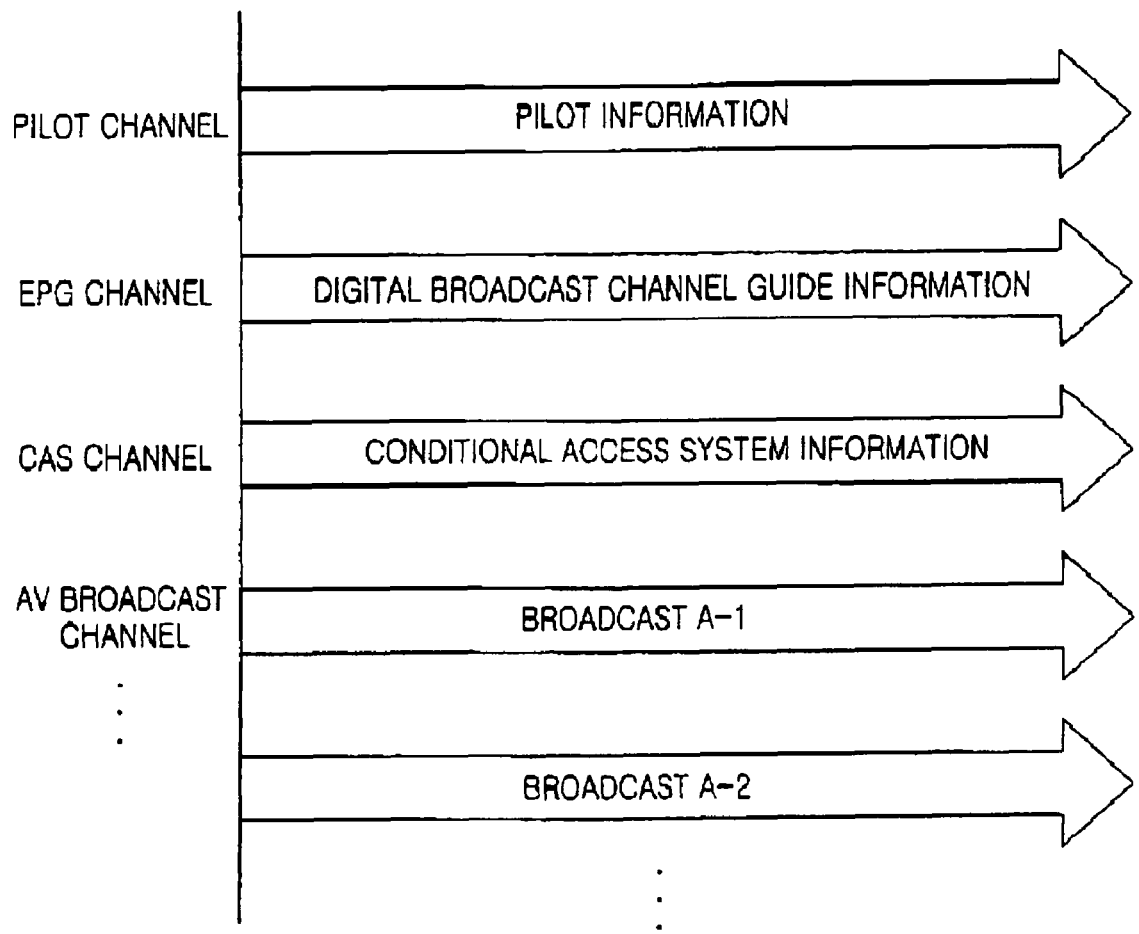
FIG. 2 shows the configuration of channels offering broadcasting services in a current DMB system.

FIG. 2 shows the configuration of channels offering broadcasting services in a current DMB system.

Referring to FIG. 2, a DMB system offers broadcasting services through a plurality of CDM channels which include: a pilot channel for transmitting pilot information; an Electronic Program Guide (EPG) channel for transmitting digital broadcast channel guide information; a Conditional Access System (CAS) channel for restricting access to the broadcasting services; and channels for actually transmitting broadcast traffic, i.e. at least two Audio/Video (AV) broadcast channels for transmitting video and audio data. The AV broadcast channels are composed of two CDM channels in video broadcasting and a single CDM channel in audio broadcasting.

Under the control of a second processor 220 of a controller 200, the receiver module 100 searches for an unused reserve channel among the CDM channels in order to receive video data of channels other than the one currently selected. One reserve channel suffices to receive video data of channels other than the one currently selected.

Figure 3:
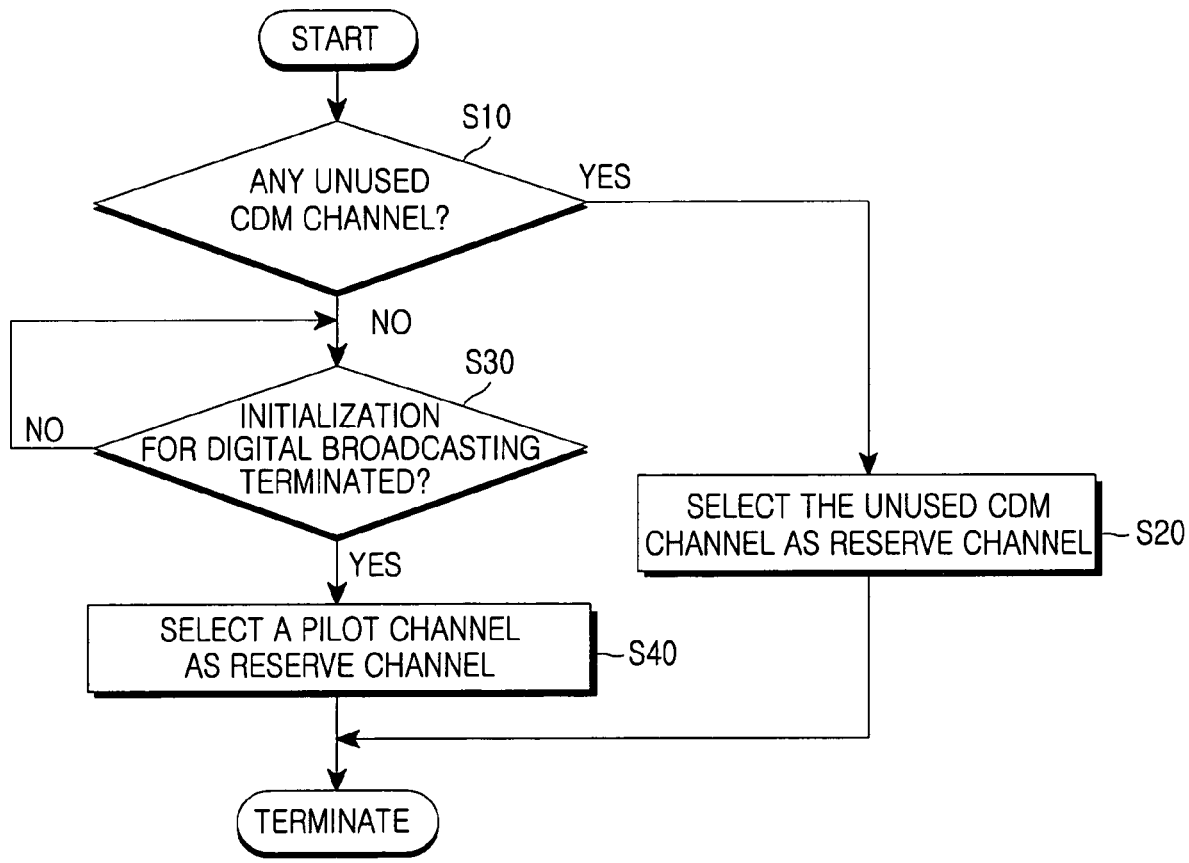
FIG. 3 is a flow chart showing a process for searching for a reserve channel according to the preferred embodiment of the present invention.

A process for searching for a reserve channel in the receiver module 100 will be explained in detail with reference to FIG. 3. The flow chart of FIG. 3 shows the process of searching for a reserve channel according to a preferred embodiment of the present invention.

Any of the CDM channels can be selected as a reserve channel if it is not being used. Therefore, the receiver module 100 searches the pilot channel, CAS channel and EPG channel to detect any unused channel (S10).

When any unused channel is detected among the pilot channel, CAS channel and EPG channel, the receiver module 100 selects the detected channel as a reserve channel (S20). When no unused channel is detected, the receiver module 100 then confirms whether initialization for digital broadcasting by the pilot channel has been terminated (S30). Such confirmation is repeated until the initialization is terminated. Upon termination of the initialization, the receiver module 100 selects the pilot channel as the reserve channel (S40).

Referring back to FIG. 1, the controller 200 includes a first processor 210 for processing video and audio data of the currently selected channel and a second processor 220 for processing video data of the other channels. When the video and audio data of the currently selected channel are received through the receiver module 100 and then inputted through a demux module 300, the first processor 210 outputs the video and audio data to a digital signal processor 400.

The second processor 220 controls the video data of channels other than the one currently selected to be received through the reserve channel detected by the receiver module 100. To receive video data from the other channels, the second processor 220 controls the changing of the channel at predetermined time intervals. The channel changing mechanism will be explained in detail with reference to FIG. 4.

Figure 4:
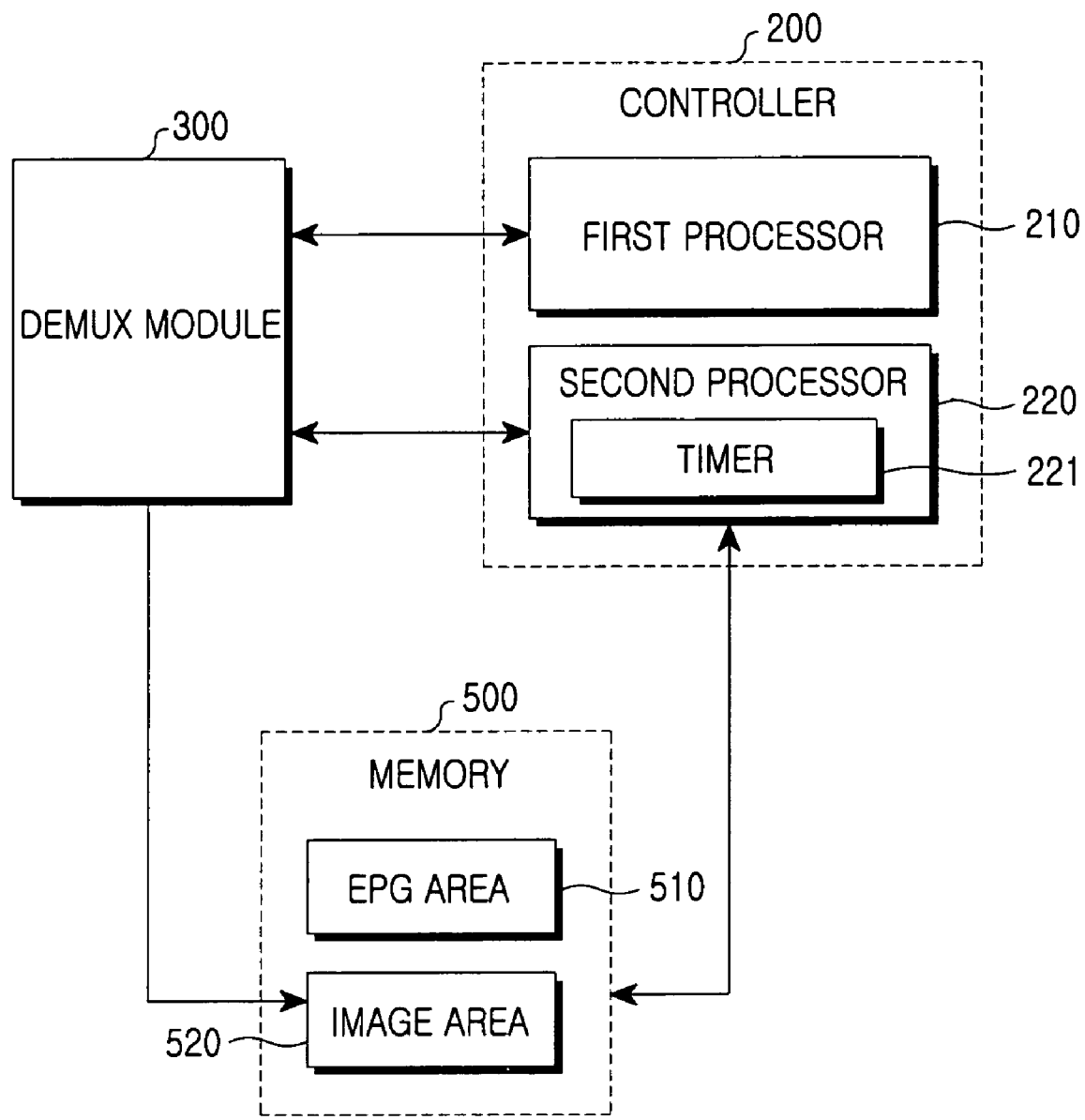
FIG. 4 is a block diagram showing a detailed structure of the digital broadcasting receiver in FIG. 1.

FIG. 4 is a block diagram showing the detailed structure of the digital broadcasting (DMB) receiver in FIG. 1. A memory 500 of the DMB receiver includes an EPG area 510 for storing digital broadcast channel guide information received through the receiver module 100 and an image area 520 for storing image data extracted by the demux module 300. The second processor 220 has a timer 221 for sequentially extracting identifiers of the other channels at predetermined time intervals from the digital broadcast channel guide information stored in the EPG area 510 of the memory 500. The second processor 220 inputs the identifiers of the other channels extracted using the timer 221 to the demux module 300 in the order of extraction.

When a specific identifier is input under the control of the second processor 220, the demux module 300 receives video data of a channel corresponding to the input specific identifier through the reserve channel detected by the receiver module 100 in FIG. 1. Then the demux module 300 extracts image data from the received video data and stores the extracted image data in the image area 520 of the memory 500. When the image data of the channel corresponding to the specific identifier is stored in the image area 520, the timer 221 of the second processor 220 is then initialized. Upon initialization of the timer 221, the second processor 220 extracts an identifier of a channel subsequent to the channel corresponding to the image data stored in the image area 520 from the digital broadcast channel guide information stored in the EPG area 510 and inputs the extracted identifier to the demux module 300. The same process is repeated to store image data of all the channels other than the one currently selected in the image area 20.

When the demux module 300 stores the image data of the other channels in the image area 520, the second processor 220 inputs the stored image data to a digital signal processor 400 in FIG. 1.

Referring back to FIG. 1, the digital signal processor 400 decodes the video and audio data of the currently selected channel which has been inputted from the first processor 210 (for example, data compressed in format of Video Compression Standard (H.264) and Advanced Audio Coding (AAC) and Special Band Replication (SBR)) using a Digital Signal Process (DSP) codec and outputs the decoded video data and audio data respectively to a display screen 620 and a speaker 610 of a user interface 600. Thus, the user can view the digital broadcast program of the selected channel through the display screen 620 and the speaker 610.

Also, when the image data stored in the image area 520 is inputted under the control of the controller 200, the digital signal processor 400 decodes the input image data and outputs the decoded image data to the display screen 620. The real-time monitoring of the other channels will be explained in detail with reference to FIGS. 5 and 6.

Figures 5, 6:
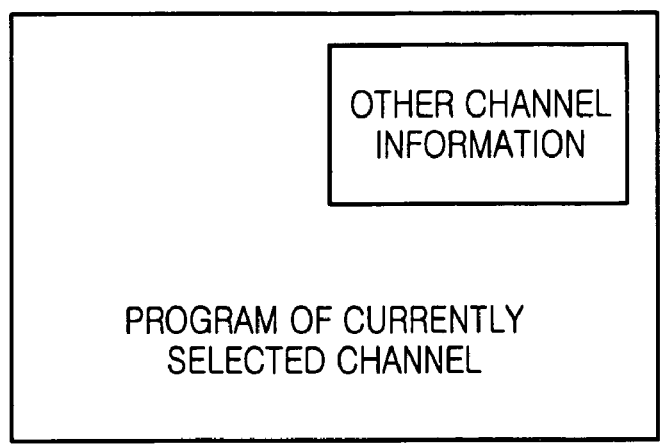
FIG. 5 illustrates a screen displaying channel information via PIP.
FIG. 6 illustrates a screen displaying channel information in a multi-split screen display manner.

FIG. 5 illustrates a screen displaying channel information via PIP. Referring to FIG. 5, the display screen 620 has a Picture-in-Picture (PIP) function and can display information of channels other than the one currently selected using the PIP function. According to a preferred embodiment of the present invention, image data of the other channels extracted by the demux module 300 is displayed together with the corresponding digital broadcast channel guide information using the PIP function.

As explained in conjunction with FIG. 4, the second processor 220 sequentially extracts identifiers of channels other than the one currently selected at predetermined time intervals from the digital broadcast channel guide information stored in the EPG area 510 of the memory 500 using the timer 221 and inputs the extracted identifiers to the demux module 300 in the order of extraction. When a specific identifier is received, the demux module 300 extracts image data of a channel corresponding to the received identifier from the video data of that channel received through the reserve channel and stores the extracted image data in the image area 520 of the memory 500.

Whenever image data is stored in the image area 520, the second processor 220 inputs the image data to the digital signal processor 400. Also, the digital signal processor 400 decodes every image data received from the second processor 220. The second processor 220 extracts digital broadcast channel guide information corresponding to each decoded image data from the EPG area 510 and outputs the extracted information and the decoded image data to the display screen 620 to be displayed together using the PIP function.

In other words, whenever the digital signal processor 400 decodes image data received under the control of the second processor 220 and outputs the decoded image data to the display screen 620, the PIP sub-screen of the display screen 620 for displaying image data of the other channels updates the displayed image data with newly input one. Accordingly, while viewing a program broadcast on the currently selected channel, the user can get text and image information about the other channels even without any key input.

Another display method for monitoring the other channels in real-time will be explained in detail with reference to FIG. 6. FIG. 6 illustrates a screen displaying channel information in a multi-split screen display manner.

Referring to FIG. 6, the display screen 620 is divided into multiple cells corresponding to a predetermined number of channels so that the user can monitor multiple channels at one time. For such divided display, the second processor 220 sequentially extracts identifiers of channels other than the one currently selected from the EPG area 510 of the memory 500 at predetermined time intervals using the timer 221 and inputs the extracted identifiers to the demux module 300 in the order of extraction. When each identifier is received, the demux module 300 extracts image data of a channel corresponding to the received identifier from video data of that channel received through the reserve channel and stores the extracted image data in the image area 520 of the memory 500.

For the PIP display as illustrated in FIG. 5, whenever image data is stored in the image area 520, the second processor 220 inputs each image data to the digital signal processor 400. However, for the multi-split screen display as illustrated in FIG. 6, the second processor 220 does not output any image data until image data of a predetermined number of channels is stored in the image area 520, or outputs image data one by one only when the image data of a predetermined number of channels is stored. The predetermined number of channels refers to two or more channels of which image data can be displayed on the display screen 620 at one time. Although FIG. 6 illustrates nine image data of nine different channels displayed on one screen, the number of image data (or number of channels displayed) can vary depending on applications of the present invention.

When image data of the predetermined number of channels is stored, the second processor 220 then inputs the stored image data of different channels to the digital signal processor 400. The digital signal processor 400 decodes the received image data of different channels. The second processor 220 extracts digital broadcast channel guide information corresponding to each decoded image data from the EPG area 510. Then the second processor 220 displays all the decoded image data of different channels and the corresponding digital broadcast channel guide information in the cells of the divided display screen 620.

Figure 7:
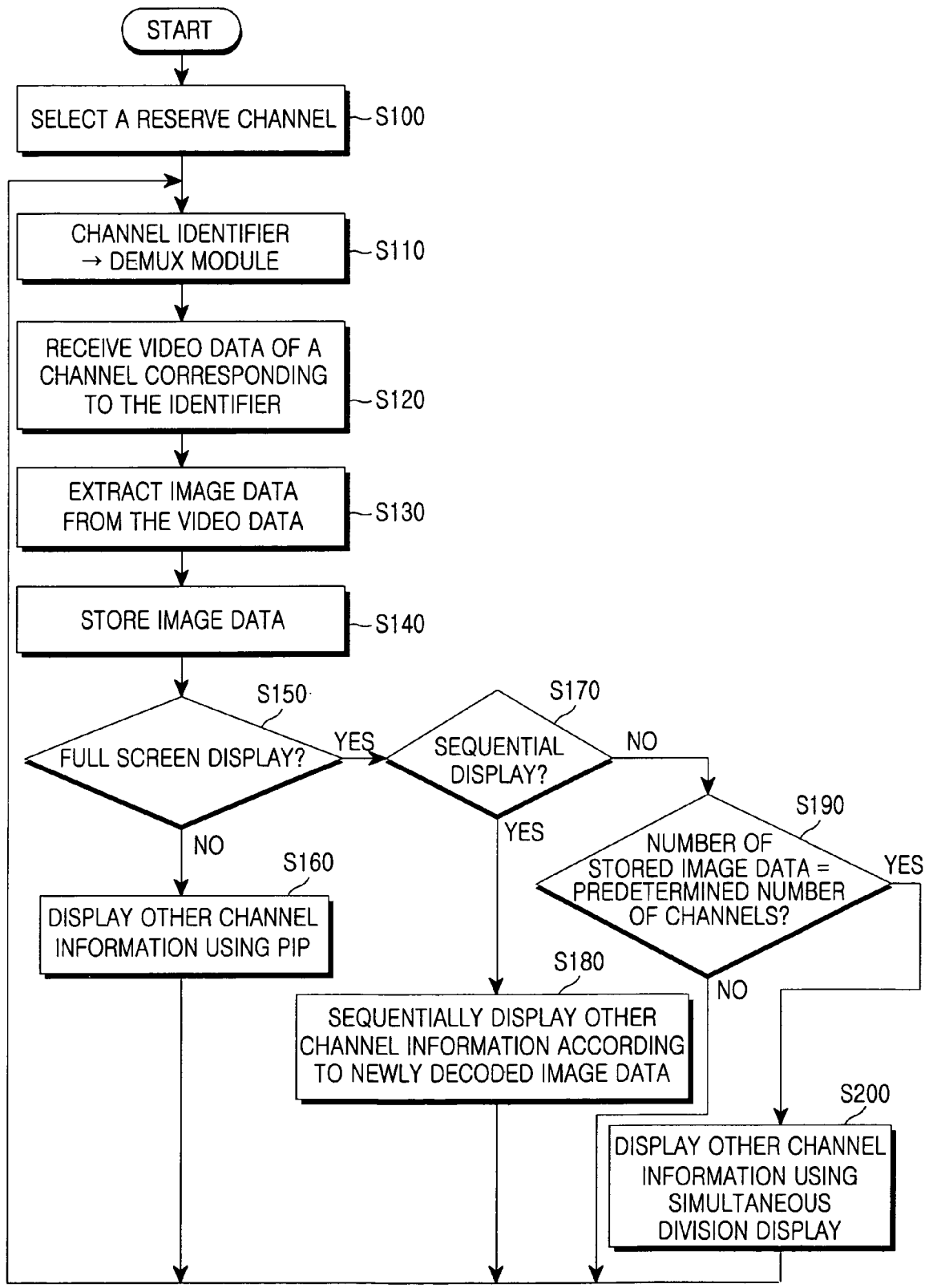
FIG. 7 is a flow chart showing a process for displaying digital broadcast channel information according to the preferred embodiment of the present invention.

Hereinafter, a process for offering text and image data of channels other than the one currently selected in the DMB receiver of FIG. 1 will be explained in detail with reference to the flow chart of FIG. 7, shows a process for displaying digital broadcast channel information according to a preferred embodiment of the present invention.

A user may wish to get text and image information automatically offered regarding other channels while viewing a program broadcast on the currently selected channel. Then the user can select a menu preset in the DMB receiver of FIG. 1 to automatically monitor other channels. Under the menu, the user can select either a PIP display or a full screen display as the other channel monitoring method. When the user selects the full screen display, the user can further select either a simultaneous division display or a sequential display.

The controller 200 confirms the other channel monitoring method selected by the user. Subsequently, the second processor 220 searches for an unused channel among all CDM channels through the receiver module 100 and thereby selects a reserve channel (S100). When an unused CDM channel is detected, the receiver module 100 selects the detected channel as a reserve channel. When no unused channel is detected, the receiver module 100 waits until initialization for digital broadcasting by the pilot channel is terminated. Upon termination of the initialization, the receiver module 100 selects the pilot channel as the reserve channel.

When a reserve channel is selected, the second processor 220 extracts a specific identifier among those channels, other than the one currently selected from the digital broadcast channel guide information stored in the EPG area 510 of the memory 500, and inputs the extracted identifier to the demux module 300 (S110).

When the specific identifier is input to the demux module 300, the second processor 220 controls the demux module 300 to receive video data of a channel corresponding to the input specific identifier through the reserve channel detected at step S100 (S120).

When the video data of a channel corresponding to the specific identifier is input to the demux module 300, the second processor 220 controls the demux module 300 to extract image data from the input video data (S130).

The second processor 220 stores the image data extracted through the demux module 300 in the image area 520 of the memory 500 (S140). Then the second processor 220 confirms whether the other channel monitoring method selected by the user at step S100 is the full screen display (S150).

If the other channel monitoring method selected by the user is the PIP display, the second processor 220 will input the image data stored in the image area 520 to the digital signal processor 400. At this time, the digital signal processor 400 decodes the input image data. Also, the second processor 200 extracts digital broadcast channel guide information corresponding to the decoded image data from the EPG area 510 and displays the extracted broadcast channel guide information and the decoded image data together on the display screen 620 using the PIP function (S160). Then the second processor 220 repeats step S110 to provide the user with information about a next channel subsequent to the channel corresponding to the currently displayed image data.

If the other channel monitoring method selected by the user is the full screen display, the second processor 220 will further confirm whether the sequential display was selected at step S100 (S170). If so, the second processor 220 will input the image data stored in the image area 520 to the digital signal processor 400. At this time, the digital signal processor 400 decodes the input image data and the second processor 220 extracts digital broadcast channel guide information corresponding to the decoded image data from the EPG area 510. The second processor 220 divides the display screen 620 into multiple cells corresponding to a predetermined number of channels and displays the decoded image data together with the extracted broadcast channel guide information in one cell of the display screen 620 (S180). The second processor 220 repeats steps S110 through S170 to sequentially display image data newly decoded by the digital signal processor 400 in the remaining cells.

If the user selected the simultaneous division display of the full screen display (S170), the second processor 220 will determine whether image data of the predetermined number of channels has been stored in the image area 520 (S190). If not, the second processor 220 will repeat steps S110 through S140 until image data of the predetermined number of channels is stored.

If the image data of the predetermined number of channels is stored in the image area 520, the second processor 220 will input the stored image data to the digital signal processor 400. At this time, the digital signal processor 400 decodes the input image data of different channels and the second processor 220 extracts digital broadcast channel guide information corresponding to each decoded image data from the EPG area 510. Then the second processor 220 divides the display screen 620 into multiple cells corresponding to the predetermined number of channels and displays all the extracted broadcast channel guide information and corresponding image data of different channels in the cells of the display screen 620 simultaneously (S200):

The second processor 220 repeats steps S110 through S140 to display broadcast information of the same number of channels subsequent to the currently displayed ones in the same display method. Also, the second processor 220 repeats step S190 confirming whether the predetermined number of image data (i.e. image data of the predetermined number of subsequent channels) is newly stored in the image area 520.

According to a preferred embodiment of the present invention, the second processor 220 displays image data of other channels stored in the image area in a PIP display, simultaneous division display or sequential display manner. However, various modifications, additions and substitutions can be made without departing from the scope and spirit of the invention. For example, when the PIP display or the sequential display is used, video data of the other channels, rather than mere image data, can be displayed as channel information. Hereinafter, a process for displaying video data of other channels according to another preferred embodiment of the present invention will be explained in detail.

Figure 8:
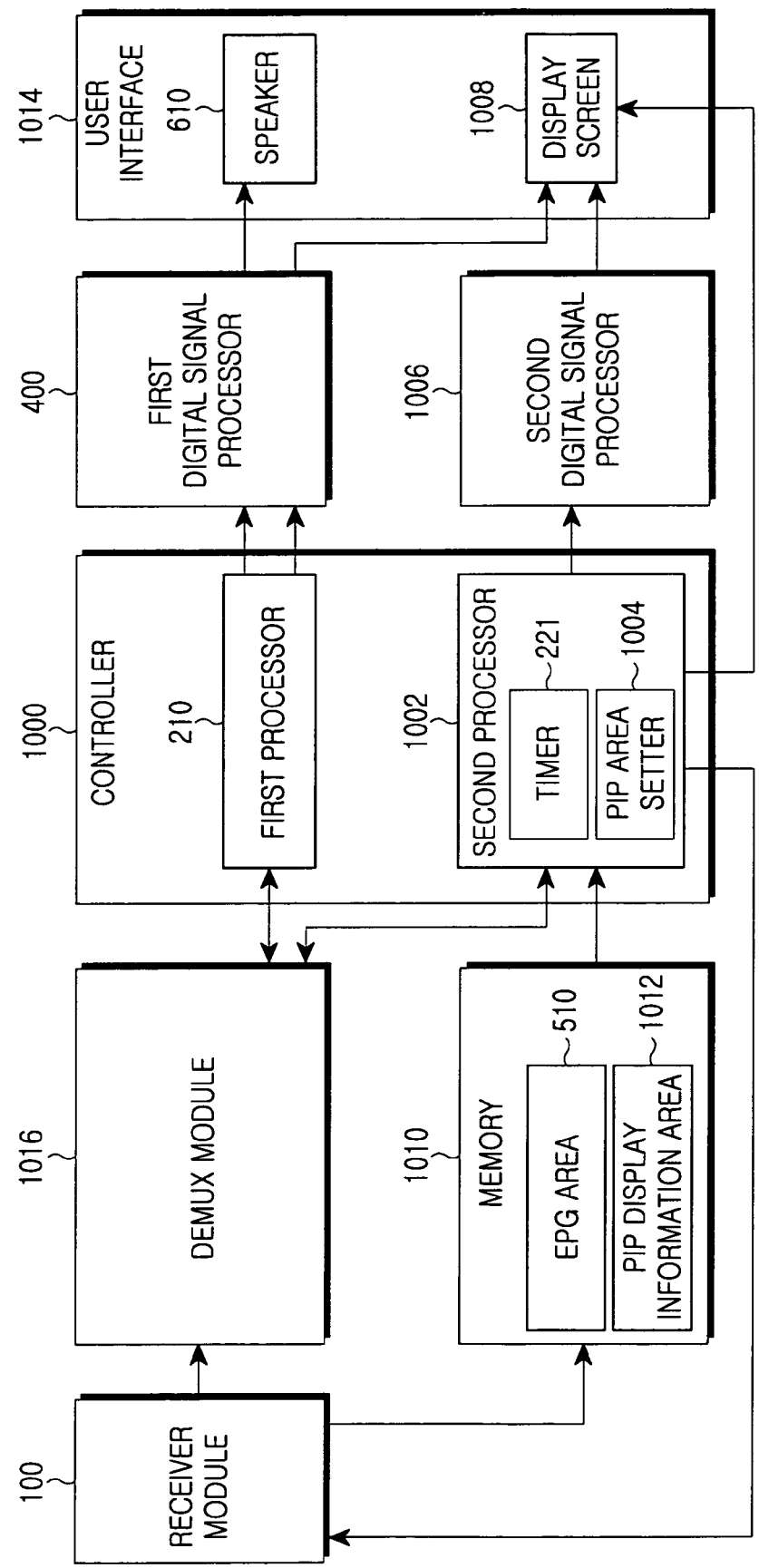
FIG. 8 shows the structure of a digital broadcasting receiver capable of displaying broadcast information of other channels according to another preferred embodiment of the present invention.

FIG. 8 shows the structure of a digital broadcasting receiver capable of displaying broadcast information of other channels according to another embodiment of the present invention.

Referring to FIG. 8, the DMB receiver according to another embodiment of the present invention, like the receiver in FIG. 1, includes a receiver module 100, a demux module 1016, a controller 1000 including a first processor 210 and a second processor 1002, a first digital signal processor 400, a user interface 1014 including a speaker 610 and a display screen 1008, and a memory 1010 including an EPG area 510 and a PIP display information area 1012. The DMB receiver further includes a second digital signal processor 1006 for decoding video data output from the second processor 1002 and outputting the decoded video data.

In the DMB receiver according to another embodiment of the present invention, the second processor 1002 extracts a channel identifier of another channel selected by the user or automatically selected by the timer 221 from the EPG area 510 and inputs the extracted identifier to the receiver module 100. Also, the second processor 1002 loads PIP display information from the PIP display information area 1012 of the memory and sets a PIP display area for outputting video data received from the other channel to the display screen 1008. The PIP display information area 1012 refers to a storage area in the memory 1010 for storing PIP display information on the PIP display screen size, i.e. the PIP display area. When video data of a channel corresponding to the extracted channel identifier is received from the demux module 1016, the second processor 1002 outputs the received video data to the second digital signal processor 1006.

Picture-in-Picture (PIP) refers to the simultaneous display of digital broadcast data of at least two different channels on one screen. As illustrated in FIG. 5, a scaled-down sub-screen for displaying digital broadcast data of a different selected channel is superimposed over a main full screen for displaying digital broadcast data of the current selected channel, thereby allowing the user to view two different data (programs) simultaneously.

A PIP display area for implementing the PIP function can be generated in various ways. One way is to first generate a sub-screen layer (i.e. a PIP display) for outputting digital broadcast data which will be displayed on the sub-screen and then superimpose the sub-screen layer on a main screen layer for outputting digital broadcast data which will be displayed on the main screen of the display screen 1008. In the following explanation of another embodiment of the present invention, it is assumed that a PIP display area is set in this way.

When a specific channel identifier is inputted from the second processor 1002, the receiver module 100 receives video data of the channel corresponding to the input identifier together with digital broadcast data of the currently selected channel. The receiver module 100 inputs the received video data and digital broadcast data to the demux module 1016.

The demux module 1016 separately demultiplexes the received video data of the specific other channel and digital broadcast data of the currently selected channel. The demux module 1016 outputs the demultiplexed digital broadcast data of the currently selected channel to the first processor 210 and the demultiplexed video data of the specific other channel to the second processor 1002.

As explained above, the second processor 1002 sets a PIP display area and outputs the video data of the specific other channel to the second digital signal processor 1006. Then the second digital signal processor 1006 decodes the video data and outputs the decoded video data to the PIP display area set by the second processor 1002.

In the DMB receiver as illustrated in FIG. 8, the second digital signal processor 1006 and the first digital signal processor 400 are provided as separate components. However, if the first digital signal processor 400 has sufficient capability, it can also implement the function of the second digital signal processor 1006. Supposing that a signal processing rate of at least 15 frames per second is demanded to normally decode and reproduce single video data, the first digital signal processor 400 alone will be able to process both the digital broadcast data on the main screen and the video data on the sub-screen if it has a processing rate over 30 frames per second. In such a case, the second digital signal processor 1006 may be unnecessary. As explained above, video data of other channels, rather than mere image data, is offered as the broadcast information of the other channels according to another embodiment of the present invention.

The DMB receiver of the present invention can display digital broadcast data of other channels automatically selected by the timer 221 in a sequential display manner. Alternatively, the DMB receiver can display digital broadcast data of a specific channel selected directly by the user. Hereinafter, a process of displaying broadcast information of other channels selected by the automatic channel selection or the direct channel selection will be explained in detail with reference to FIG. 9. In the following explanation, channel selection used for the sequential display will be referred to as "automatic selection," whereas channel selection by the user's direct designation will be referred to as "direct selection."

Figure 9A:
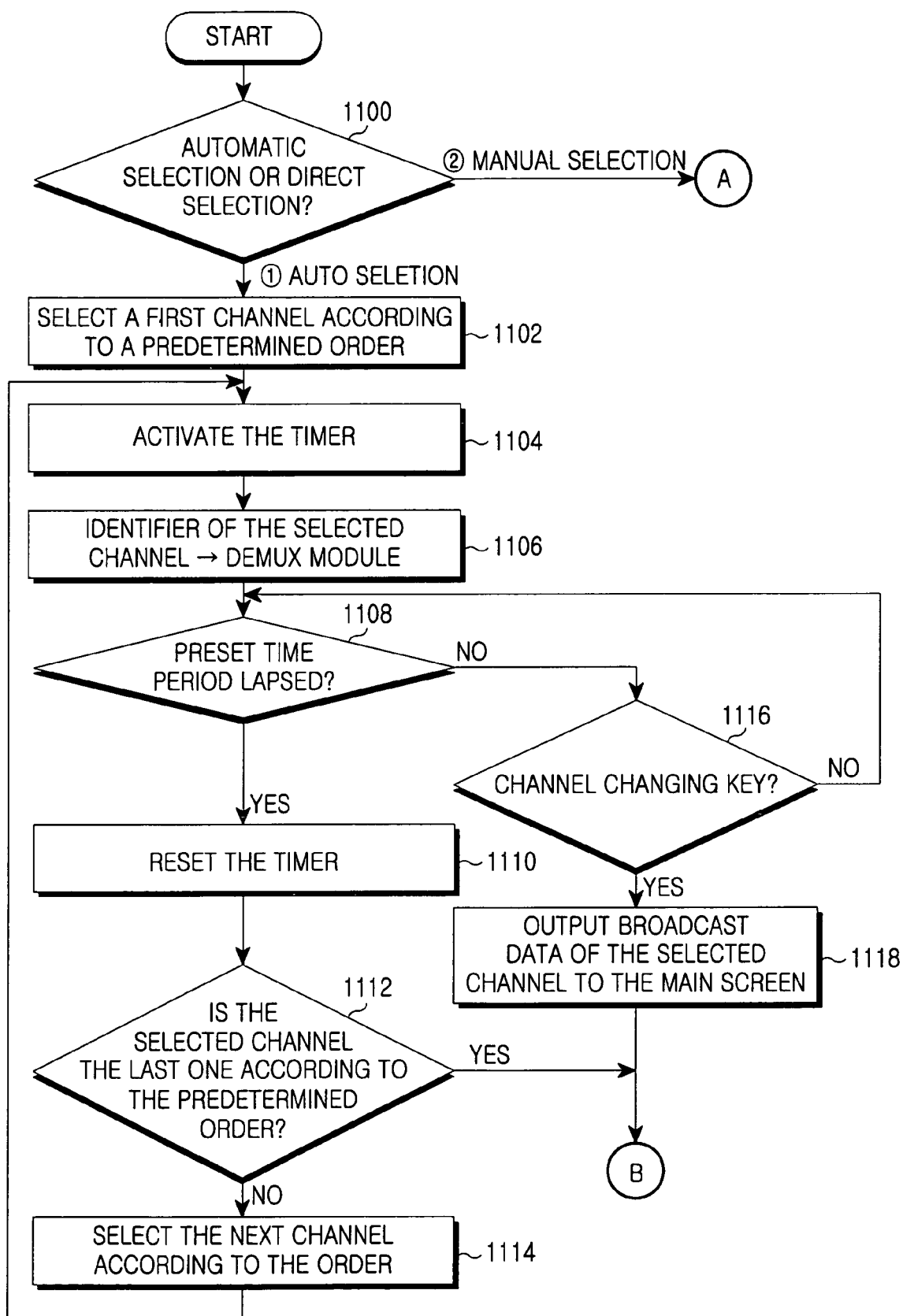
FIG. 9A is a flow chart showing a process for displaying broadcast information of other channels selected by an automatic selection method according to still another embodiment of the present invention.
Figure 9B:
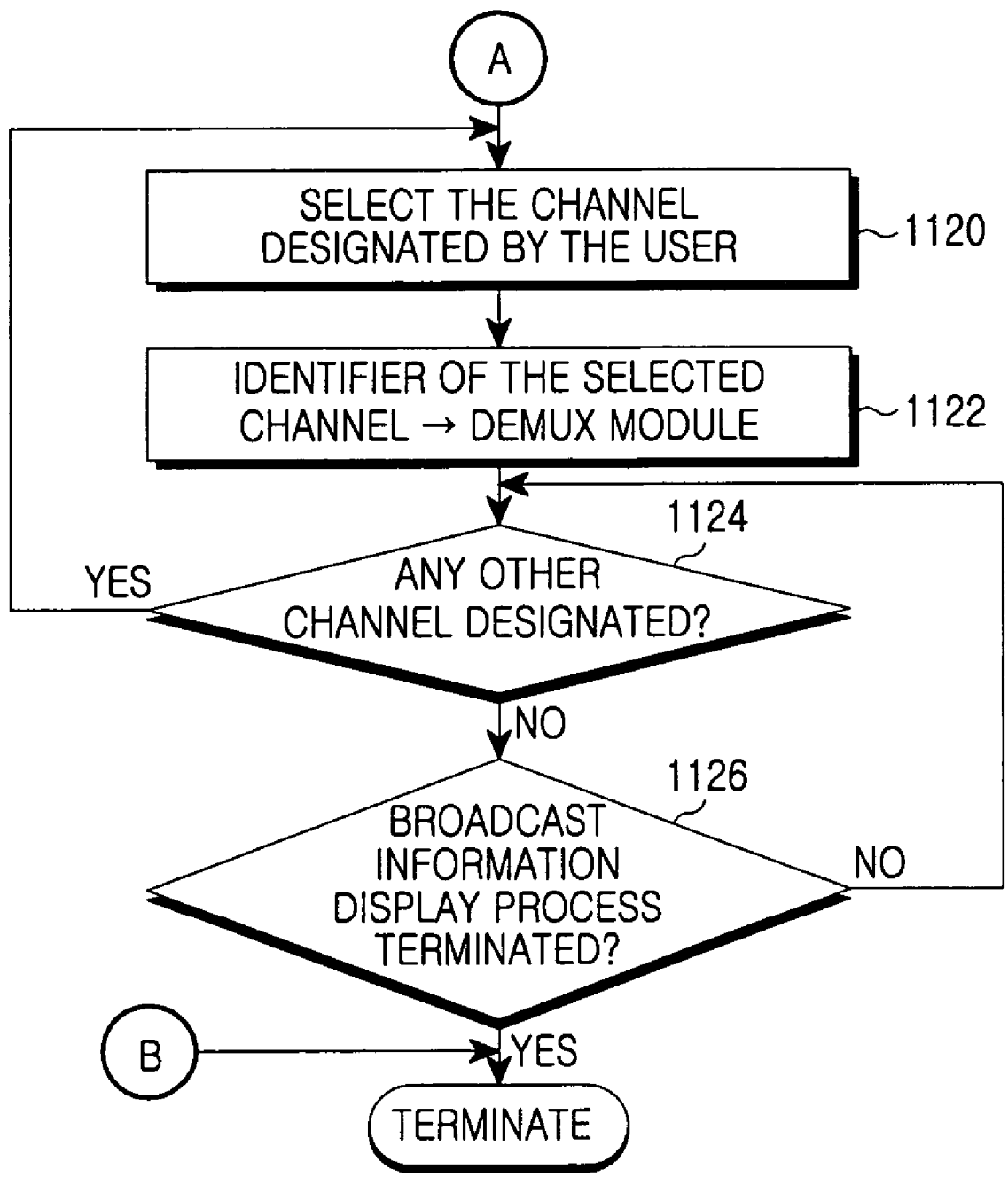
FIG. 9B is a flow chart showing a process for displaying broadcast information of a specific channel selected by a direct selection method according to still another embodiment of the present invention.

FIGS. 9A and 9B are flow charts showing a process for displaying broadcast information of other channels selected by the automatic selection or the direct selection according to still another embodiment of the present invention.

Referring to FIG. 9A, when the user selects a menu for displaying broadcast information of other channels, the controller 1000 of the DMB receiver proceeds to step 1100 to determine whether the currently set channel selection manner for displaying broadcast information of other channels is the automatic selection or the direct selection.

When the automatic selection is currently set, the controller 1000 proceeds to step 1102 to select a first one of all digital broadcast channels excluding the currently selected channel according to a predetermined order. Then the controller 1000 activates the timer 221 with a preset time period at step 1104. The controller 1000 proceeds to step 1106 to extract a channel identifier corresponding to the first channel selected at step 1102 from the digital broadcast channel guide information stored in the EPG area 510 of the memory 1010 and inputs the extracted identifier to the demux module 1016. When the channel identifier is input to the demux module 1016, the DMB receiver according to another embodiment of the present invention receives video data from the channel corresponding to the input identifier and outputs the video data to a preset PIP display area. Hereinafter, a process of receiving video data of the channel corresponding to the input identifier and outputting the video data will be explained in detail with reference to FIG. 10.

At step 1108, the controller 1000 checks the timer 221 to confirm whether the preset time period has lapsed. If the preset time period has elapsed, the controller 1000 will proceed to step 1110 to reset the timer 221. At step 1112, the controller 1000 checks whether the channel selected at step 1102 is the last one of all the digital broadcast channels excluding the currently selected one. If the channel selected at step 1102 is not the last one according to the predetermined order, the controller 1000 will proceed to step 1114 to select the next of the digital broadcast channels excluding the currently selected channel. Then the controller 1000 will repeat steps 1104 through 1112.

The DMB receiver may further include a channel changing key for selecting the channel of which video data is currently being displayed on the PIP sub-screen. If it is confirmed at step 1108 that the preset time period has not lapsed, the controller 1000 will proceed to step 1116 to confirm whether the channel changing key is pressed. If not, the controller 1000 will repeat step 1108 to check again whether the preset time period has lapsed. If it is confirmed at step 1116 that the channel changing key is pressed, the controller 1000 will proceed to step 1118. At step 1118, the controller 1000 recognizes that the user has selected the channel of which video data is currently being displayed on the PIP sub-screen and therefore outputs digital broadcast data corresponding to a channel identifier of the newly selected channel.

In other words, when the channel changing key is pressed, the controller 1000 terminates the broadcast information display process and inputs the channel identifier of the newly selected channel to the receiver module 100 at step 1118. Then the receiver module 100 receives digital broadcast data of the newly selected channel corresponding to the inputted channel identifier. The demux module 1016 inputs the channel identifier of the newly selected channel to the first processor 210 which will then output the channel identifier to the first digital signal processor 400. Since the broadcast information display process has been terminated at step 118, the second processor 1002 and the second digital signal processor 1006 discontinue operation. With the pressing of the channel changing key, the PIP display area set as a sub-screen for displaying broadcast information is removed from the display screen 1008. Thus, the digital broadcast data output to the sub-screen before the pressing of the channel changing key is output to the full display screen 1008 and the speaker 610.

With the pressing of the channel changing key, digital broadcast data output to the sub-screen is selected as a main picture. Alternatively, the digital broadcast data output to the sub-screen can be switched to a main picture and that output to the main screen can be switched to a sub-picture. In other words, the controller 1000 can switch the channel identifier of the channel selected before the pressing of the channel changing key with that of the channel newly selected at step 1102 or 1114 and input the switched identifiers to the receiver module 100. At this time, the receiver module 100 receives digital broadcast data including video and audio data from the channel selected in step 1102 or 1114 and only video data from the previously selected channel.

The demux module 1016 demultiplexes the digital broadcast data of the channel newly selected in step 1102 or 1114 and outputs the demultiplexed data to the first processor 210. Then the first processor 210 outputs the demultiplexed digital broadcast data to the first digital signal processor 400 to decode video data and audio data included in the digital broadcast data. The decoded video data and audio data are output respectively to the main screen of the display screen 1008 and the speaker 610. The demux module 1016 demultiplexes the video data received from the channel selected before the pressing of the channel changing key and outputs the demultiplexed video data to the second processor 1002 which will then output the demultiplexed video data to the second digital signal processor 1006.

In summary, when the channel changing key is pressed, the main picture output to the main screen of the display screen 1008 is switched with the sub-picture outputted to the sub-screen. Accordingly, audio data corresponding to the sub-picture before the pressing of the key is output to the speaker 610.

Hereinafter, a process for displaying broadcast information of a specific channel selected by the direct selection method will be explained in detail with reference to FIG. 9B. When the direct selection is currently set for displaying broadcast information (step 1100), the controller 1000 selects a channel designated directly by the user at step 1120 and inputs a channel identifier of the selected channel to the demux module 1016 at step 1122. Then the controller 1000 proceeds to step 1124 to determine whether the user has designated another channel. If another channel has been designated, the controller 1000 will repeat steps 1120 and 1122 to select the other channel and input a corresponding channel identifier.

If it is determined at step 1124 that no other channel is designated, the controller 1000 will proceed to step 1126 to confirm whether or not the broadcast information display process has been terminated. If not, the controller 1000 will repeat step 1124 to determine whether the user has designated another channel. If it is determined at step 1126 that the broadcast information display process has been terminated, the controller 1000 will turn off the second processor 1002 and the second digital signal processor 1006. Since the second processor 1002 and the second digital signal processor 1006 no longer operates, the PIP display function is cancelled and the sub-screen is not superimposed on the main screen.

Of course, the channel changing key can also be used in the direct selection. When the user presses the channel changing key, the channel designated by the user is selected so that its digital broadcast data can be output to the full display screen 1008. Alternatively, the digital broadcast data output to the sub-screen can be switched to a main picture and that output to the main screen to a sub-picture. Therefore, the DMB receiver outputs video data of other channels automatically selected or directly designated by the user to a preset PIP display area, which eliminates the need to search for every channel to find a desired channel. While viewing the video data of other channels output to the PIP display area, the user can select a desired channel to view the program broadcast on the channel.

Figure 10:
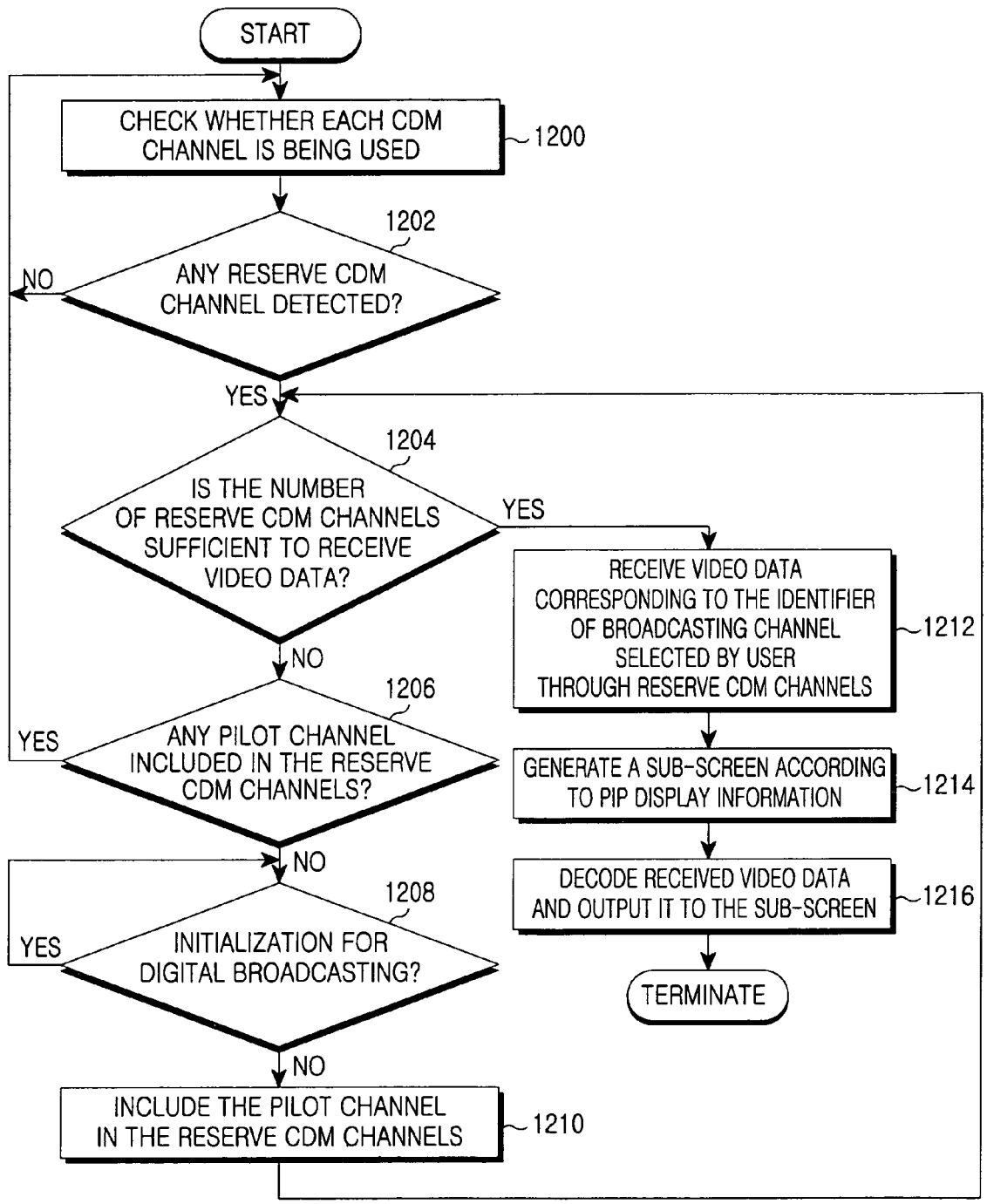
FIG. 10 is a flow chart showing a process for outputting video data of a selected channel according to still another embodiment of the present invention.

FIG. 10 is a flow chart showing a process for outputting video data of a selected channel according to the present invention. Referring to FIG. 10, when a specific channel is selected at step 1102, 1114 or 1120 of FIG. 9A or 9B and a channel identifier of the selected channel is input to the demux module 1016, the controller 1000 proceeds to step 1200 to confirm whether or not each CDM channel is being used. At step 1202, the controller 1000 detects any reserve CDM channel which is not being used. If no reserve CDM channel is detected, the controller 1000 will repeat step 1200 to confirm whether each CDM channel is being used.

If at least one reserve CDM channel is detected at step 1202, the controller 1000 will proceed to step 1204 to determine whether the number of the reserve CDM channels is sufficient to receive video data. If the number of the reserve CDM channels is not sufficient to receive video data, the controller 1000 will further determine whether a pilot channel is included in the reserve CDM channels at step 1206. If a pilot channel is detected at step 1206, the controller 1000 will return to step 1200 to confirm whether each CDM channel is being used and will repeat steps 1202 through 1206.

If no pilot channel is detected at step 1206, the controller 1000 will proceed to step 1208 to confirm whether the DMB receiver is performing an initialization process for digital broadcasting, i.e. a process for receiving pilot information and checking the configuration of the CDM channels. If the DMB receiver is in the initialization process, the controller 1000 will wait until the initialization is completed.

If the initialization is completed, the controller 1000 will include the pilot channel in the reserve channels at step 1210. The pilot channel, as a channel for receiving pilot information, is used only in the initialization.

With the inclusion of the pilot channel in the reserve channels at step 1210, the number of reserve channels in the DMB receiver will increase by one. The controller 1000 then repeats step 1204 to determine whether the number of the current reserve CDM channels (including the pilot channel) is sufficient to receive video data. Supposing that two CDM channels are required to receive video data of general digital broadcasting, the DMB receiver according to the present invention can receive video data if it has at least one reserve CDM channel excluding the pilot channel. Accordingly, if at least one CDM channel can be used as a reserve channel, the controller 1000 will determine that the number of the reserve channels is sufficient to receive video data at step 1204.

If it is determined at step 1204 that the number of the reserve CDM channels is sufficient to receive video data, the controller 1000 will proceed to step 1212 to receive video data corresponding to a channel identifier of the channel selected at step 1102, 1114 or 1120 of FIG. 9A or 9B through the reserve CDM channels. Subsequently, the controller 1000 proceeds to step 1214 to generate a sub-screen based on the PIP display information stored in the PIP display information area 1012. At step 1216, the controller 1000 decodes the video data received at step 1212 through the second digital signal processor 1006 and outputs the decoded video data to the generated sub-screen. Accordingly, the DMB receiver can display image data or video data of channels other than the one currently selected as broadcast information on the sub-screen.

As explained above, the present invention provides a method and a DMB receiver for displaying image or video information of channels other than the one currently selected, as well as text information of the other channels. Accordingly, the user can get broadcast information of the other channels while viewing a program broadcast on the currently selected channel. The DMB receiver can automatically update the broadcast information of the other channels or simultaneously display image data of multiple channels on one screen, thereby improving user convenience. Also, the DMB receiver eliminates the need to newly assign a channel to receive broadcast information of the other channels.

Although preferred embodiments of the present invention have been described for illustrative purposes, those skilled in the art will appreciate that various modifications, additions and substitutions are possible, without departing from the scope and spirit of the invention as disclosed in the accompanying claims, including the full scope of equivalents thereof.

What is claimed is:

1. A method for displaying digital broadcast channel information on a digital broadcasting receiver, which comprises the steps of:
    searching for an unused reserve communication path among all communication paths over which digital broadcast data is transmitted;
    sequentially extracting identifiers of channels, other than a currently selected channel, from digital broadcast channel guide information and sequentially receiving video data of a plurality of programs respectively corresponding to each of the extracted identifiers, through the reserve communication path;
    processing each of the received video data to extract image data from the video data, and extracting digital broadcast channel guide information corresponding to the image data; and
    displaying at least one of the extracted image data and corresponding extracted digital broadcast channel guide information together with a program broadcast on the currently selected channel;
    wherein the displayed extracted image data is sequentially and automatically changed to other extracted image data at predetermined time intervals.

2. The method as claimed in claim 1, wherein said communication paths are Code Division Multiplexing (CDM) channels.

3. The method as claimed in claim 1, wherein said reserve communication path is any one of a pilot channel, a Conditional Access System (CAS) channel and an Electronic Program Guide (EPG) channel included in the CDM channels.

4. The method as claimed in claim 3, further comprising the steps of:
- when no reserve communication path is detected, checking whether initialization for digital broadcasting by the pilot channel has been terminated; and
- upon termination of the initialization, setting the pilot channel as the reserve communication path.

5. The method as claimed in claim 1, wherein said extracted image data and corresponding digital broadcast channel guide information are displayed together with the program broadcast on the currently selected channel using a Picture in Picture (PIP) function.

6. The method as claimed in claim 1, further comprising the steps of:
- storing the image data extracted from the received video data until a predetermined number of images of different channels are stored; and
- when the predetermined number of images are stored, simultaneously displaying the stored images and corresponding digital broadcast channel guide information on one screen.

7. The method as claimed in claim 1, further comprising the step of sequentially displaying the extracted image data and corresponding digital broadcast channel guide information on a display screen divided into a predetermined number of cells.

8. A digital broadcasting receiver having a display screen with a Picture In Picture (PIP) function, comprising:
- a receiver module for receiving digital broadcast data and searching for an unused reserve communication path among all communication paths over which the digital broadcast data is transmitted;
- a memory for storing digital broadcast channel guide information received through the receiver module;
- a controller for extracting identifiers of channels, other than a currently selected channel, from the digital broadcast channel guide information stored in the memory and receiving video data of programs broadcast on channels corresponding to the identifiers through the reserve communication path, with changes of channel according to the identifiers; and
- a demux module for extracting image data from video data of each channel received through the reserve communication path, extracting digital broadcast channel guide information corresponding to the extracted image data from the memory and displaying at least one of the extracted image data and corresponding extracted digital broadcast channel guide information together with a program broadcast on the currently selected channel on the display window under the control of the controller,
- wherein the displayed extracted image data is sequentially and automatically changed to other extracted image data at predetermined time intervals.

9. The digital broadcasting receiver as claimed in claim 8, wherein said communication paths are Code Division Multiplexing (CDM) channels.

10. The digital broadcasting receiver as claimed in claim 8, wherein said reserve communication path is any one of a pilot channel, a Conditional Access System (CAS) channel and an Electronic Program Guide (EPG) channel included in the CDM channels.

11. The digital broadcasting receiver as claimed in claim 10, wherein said receiver module checks whether initialization for digital broadcasting by the pilot channel has been terminated when no reserve communication path is detected, and sets the pilot channel as the reserve communication path upon termination of the initialization.

12. The digital broadcasting receiver as claimed in claim 8, wherein said controller displays each extracted image data and corresponding digital broadcast channel guide information together with the program broadcast on the currently selected channel using a Picture in Picture (PIP) function.

13. The digital broadcasting receiver as claimed in claim 8, wherein said controller stores image data of different channels extracted by the demux module to a predetermined number and simultaneously displays the predetermined number of image data together with corresponding digital broadcast channel guide information extracted from the memory on one screen.

14. The digital broadcasting receiver as claimed in claim 10, wherein said controller divides a display screen into a predetermined number of cells and sequentially displays the extracted image data and corresponding digital broadcast channel guide information on the divided display screen.

15. A method for displaying digital broadcast channel information on a digital broadcasting receiver with a Picture in Picture (PIP) function, which comprises the steps of:
- searching for an unused reserve communication path among all communication paths over which digital broadcast data is transmitted; sequentially extracting identifiers of channels, other than a currently selected channel, from digital broadcast channel guide information and sequentially receiving video data of a plurality of programs respectively corresponding to each of the extracted identifiers, through the reserve communication path
- generating a PIP sub-screen for outputting the received video data; and
- processing and displaying at least one of the received video data on the generated PIP sub-screen,
- wherein the displayed video data is sequentially and automatically changed to other video data at predetermined time intervals.

16. The method as claimed in claim 15, wherein said step of selecting another channel is either an automatic selection that selects the other channel according to a predetermined order using a timer provided in the digital broadcasting receiver, or a direct selection that selects a channel which is designated directly by the user.

17. The method as claimed in claim 15, wherein said step of receiving video data includes:
- checking Code Division Multiplexing (CDM) channels to confirm whether at least one CDM channel is not currently being used;
- when unused CDM channels are detected and selected as reverse channels, confirming whether the number of the reserve CDM channels is sufficient to receive video data of digital broadcasting; and
- when the number of the reserve CDM channels is sufficient to receive video data, receiving video data of the selected other channel through the reserve CDM channels.

18. The method as claimed in claim 17, further including:
- when the number of the reserve CDM channels is not sufficient to receive video data of digital broadcasting, confirming whether a pilot channel is included in the reserve CDM channels;
- when a pilot channel is included in the reserve CDM channel, confirming whether the digital broadcasting receiver is currently performing initialization for digital broadcasting; and
- when the initialization is not being performed, including the pilot channel in the reserve CDM channels.

19. The method as claimed in claim 15, further comprising the steps of:

confirming whether a channel changing key is pressed; and when the channel changing key is pressed, displaying video data which has been displayed on the PIP sub-screen to a PIP main screen and outputting audio data of a channel corresponding to the video data to a speaker.

20. A digital broadcasting receiver having a display screen with a Picture in Picture (PIP) function, which comprises:

a receiver module for receiving digital broadcast data and searching for an unused reserve communication path among all communication paths over which the digital broadcast data is transmitted;

a memory for storing digital broadcast channel guide information received through the receiver module and PIP display information on a PIP sub-screen which will be generated on the display screen using the PIP function;

a controller for extracting one of identifiers of channels other than a currently selected channel from the digital broadcast channel guide information according to a preset broadcast information display manner and sequentially receiving video data respectively corresponding to each of the extracted identifiers through the reserve communication path detected by the receiver module;

a first digital signal processor for decoding broadcast data of the currently selected channel and outputting the decoded broadcast data to the display screen;

a second digital signal processor for sequentially decoding each video data received through the reserve communication path and sequentially and automatically outputting each of the decoded video data to the PIP sub-screen generated on the display screen at predetermined time intervals, under the control of the controller; and a demux module for demultiplexing broadcast data received from the receiver module and outputting the broadcast data of the currently selected channel to the first digital signal processor and the video data corresponding to the extracted identifier to the second digital signal processor.

21. The digital broadcasting receiver as claimed in claim 20, wherein said controller includes:

a first processor for receiving the broadcast data of the currently selected channel and controlling video and audio data included in the broadcast data to be decoded; and a second processor for controlling identifiers of the other channels to be extracted by either an automatic selection that automatically selects the channels at preset time intervals or a direct selection that selects a channel designated directly by a user.

22. The digital broadcasting receiver as claimed in claim 21, wherein said second processor includes a timer for checking the preset time intervals for the automatic selection.

23. The digital broadcasting receiver as claimed in claim 21, wherein said second processor further includes a Picture in Picture (PIP) area setter for generating the PIP sub-screen on the display screen using the PIP display information.

24. The digital broadcasting receiver as claimed in claim 20, further comprising a key input unit having a channel changing key.

25. The digital broadcasting receiver as claimed in claim 24, wherein said controller displays video data which has been displayed on the Picture in Picture (PIP) sub-screen to a PIP main screen and outputs audio data of a channel corresponding to the video data to a speaker when the channel changing key is pressed.

* * * * *